United States Patent [19]

Loomis et al.

[11] Patent Number: 5,625,668
[45] Date of Patent: Apr. 29, 1997

[54] POSITION REPORTING CELLULAR TELEPHONE

[75] Inventors: Peter V. W. Loomis, Sunnyvale; Peter L. Froeberg, Cupertino, both of Calif.

[73] Assignee: Trimble Navigation Limited, Sunnyvale, Calif.

[21] Appl. No.: 226,773

[22] Filed: Apr. 12, 1994

[51] Int. Cl.⁶ .................. H04Q 7/20; H04Q 7/30
[52] U.S. Cl. .............. 379/58; 379/63; 342/357; 342/457
[58] Field of Search ............. 379/58, 59, 63; 340/989, 991, 993, 996; 342/357, 450, 451, 457

[56] References Cited

U.S. PATENT DOCUMENTS

| | | | |
|---|---|---|---|
| 4,833,477 | 5/1989 | Tendler | 342/389 |
| 5,006,985 | 4/1991 | Ehret et al. | 364/413.01 |
| 5,043,736 | 8/1991 | Darnell et al. | 342/357 |
| 5,428,546 | 6/1995 | Shah et al. | 364/449 |
| 5,479,482 | 12/1995 | Grimes | 379/59 |

OTHER PUBLICATIONS

Motorola DPC-550 Brochure for handheld portable cellular telephone.
Trimble Navigation SCOUT Brochure for handheld portable GPS receiver.

*Primary Examiner*—William Cumming
*Assistant Examiner*—Nay Maung
*Attorney, Agent, or Firm*—Thomas E. Schatzel; Law Offices of Thomas E. Schatzel A Prof. Corporation

[57] ABSTRACT

A cellular telephone system embodiment of the present invention comprises a combination global positioning system (GPS) receiver and cellular transceiver and a data processing facility for converting latitude, longitude, velocity and bearing information provided by the GPS receiver into meaningful descriptors that are spoken with a speech synthesizer back to the cellular transceiver or an outsider who calls in an inquiry to a "1-900" service.

1 Claim, 3 Drawing Sheets

POSITION REPORTING CELLULAR TELEPHONE

BACKGROUND OF THE INVENTION

1. Field of the Invention

The invention relates generally to navigation systems and mobile telephone systems and more specifically to combinations of navigation and cellular telephone instruments that can automatically report a mobile phone location in street address and other non-traditional location formats.

2. Description of the Prior Art

By their very nature, cellular telephones are mobile. However, a cellular telephone user or a user's caller may not know the current location of the user's cellular telephone, because the user is unavailable or does not know its location in precise terms.

The automatic reporting of a user's cellular telephone location is useful in a number of situations. However, most cellular telephone users are not professional navigators and need to have their locations expressed in lay terms, e.g., street locations or proximity to major intersections. Emergency services and dispatchers who have access to a user's location also need an automated position answer expressed in familiar lay terms, if not directly integrated with an automatic vehicle locator (AVL) dispatch system.

SUMMARY OF THE PRESENT INVENTION

It is therefore an object of the present invention to provide a cellular telephone that automatically reports its position.

It is a further object of the present invention to provide a system that can report back to a cellular telephone user the user's location in spoken lay terms.

It is another object of the present invention to provide a system that can report a cellular telephone user's location in spoken lay terms to an inquirer who calls in.

Briefly, a cellular telephone system embodiment of the present invention comprises a combination global positioning system (GPS) receiver and cellular transceiver and a data processing facility for converting latitude, longitude and bearing information provided by the GPS receiver into meaningful descriptors that are spoken with a speech synthesizer back to the cellular transceiver or an outsider who calls in an inquiry to a service, e.g., a "1–900" service.

An advantage of the present invention is that a cellular telephone is provided that can automatically report its position.

Another advantage of the present invention is that an cellular telephone is provided that can have its position automatically determined from an outside location.

A further advantage of the present invention is that a position determination is provided for a cellular telephone that is expressed in a meaningful format to a lay person, e.g., a street address.

These and other objects and advantages of the present invention will no doubt become obvious to those of ordinary skill in the art after having read the following detailed description of the preferred embodiment which is illustrated in the drawing figures.

IN THE DRAWINGS

DETAILED DESCRIPTION OF THE PREFERRED EMBODIMENT

Figure 1:
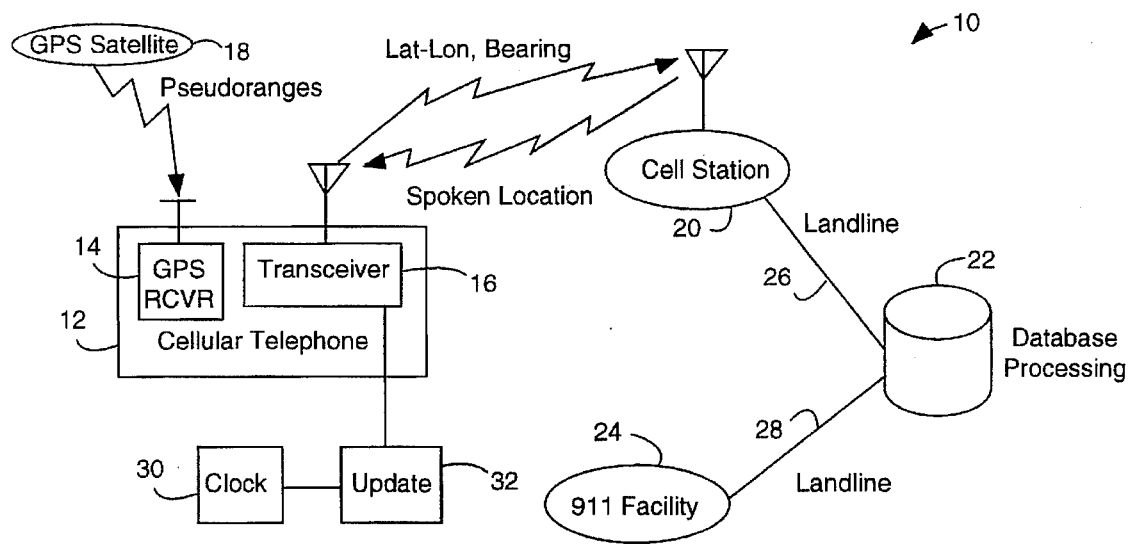
FIG. 1 is a block diagram of a GPS-based cellular phone position reporting system embodiment of the present invention.

FIG. 1 illustrates a cellular telephone locating system embodiment of the present invention, referred to herein by the general reference numeral 10. System 10 comprises a cellular telephone 12 which includes a global positioning system (GPS) navigation receiver 14 and a cellular telephone service radio transceiver 16. A plurality of orbiting GPS satellites, represented by a GPS satellite 18, transmit pseudorange information on microwave radio carriers and have determinable orbits such that the earth location of cellular telephone 12 can be ascertained by triangulation of these pseudoranges. GPS receiver 14 can be a conventional instrument which is commercially available, e.g., the SCOUT marketed by Trimble Navigation (Sunnyvale, Calif.). Cellular transceiver 16 can be a conventional device which is commercially available, e.g., the DPC-550 marketed by Motorola, CellularOne (Phoenix, Ariz.). GPS receiver 14 provides latitude, longitude and bearing information in modem tone format to cellular transceiver 16. Preferably, such information is automatically transmitted by cellular transceiver 16 shortly after processing off-hook call routing data.

A land-fixed cellular station 20 provides two-way full duplex telephonic communication over radio channels assigned for that purpose. Cellular stations, such as cellular station 20 are ubiquitous in the United States and cellular station 20 is conventional and ordinary in this regard. A database processing facility 22 receives the latitude, longitude and bearing information and uses that data to index a plurality of databases, e.g., street, landmark, road services, intersection, zone and jurisdiction databases. For example, a "911" facility 24 provides centralized emergency dispatching for telephone subscribers. In California, cellular telephone users are routed to the California Highway Patrol dispatcher when they dial "911". Unlike land-based phones which automatically provide a physical address automatically to the "911" service, prior art cellular phones do not.

A landline 26 carries latitude, longitude and bearing data regarding cellular telephone 12 to the database processing facility 22. If a particular call is a "911" emergency call, a landline 28 connects the database processing facility 22 to the "911" facility 24 and provides either spoken or digital information about the location of cellular telephone 12 in meaningful terms. For example, since latitude and longitude data are awkward for a police dispatcher to use, database processing facility 22 converts such data to street address format, e.g., "Eastbound on 900 Benicia Avenue, Sunnyvale, Calif.", if velocity is included, otherwise, "900 Benicia Avenue, Sunnyvale, Calif.". A speech synthesizer is included in database processing facility 22 in the event such information needs to be spoken.

A clock 30 is alternatively located proximate to cellular telephone 12 to display the local time according to which of the several earth time zones cellular telephone 12 is presently within. Sharp, distinct geographic boundaries exist between such time zones, and an accurate geographic position fix is provided by GPS receiver 14. An update device 32 connected to the clock 30 provides for the receipt of time zone information and incorporates an offset, e.g., an offset from Universal Time, for periodic setting of the time displayed on clock 30. The database processing facility provides time zone data as interpreted from the latitude and longitude information it receives over landline 26.

Alternatively, cellular telephone 16 may also transmit to cellular station 20 and database processing facility 22 the identity of each GPS satellite 18 that contributed to the position fix determined by GPS receiver 14. Differential correction information is then stored in database processing facility 22 and used to correct the position fixes received. This then permits meter-level position determination accuracies, as may be required to settle jurisdictional ambiguities, e.g., whether the local sheriff or highway patrol should be involved.

In general, GPS receivers can either be one of two types, authorized or unauthorized. The authorized GPS receivers are able to receive and decode a second carrier channel (L2) from the orbiting GPS satellites that carries precision code (P-code) data that must be decrypted with a special military decryption device. When selective availability (SA) is engaged by the government, the position accuracy of unauthorized GPS receivers is degraded because such receivers are able to only use the coarse acquisition (C/A) code available on the primary carrier channel (L1), and that data is deliberately dithered during SA. Position solutions that are computed therefore become randomly skewed over time in heading and distance from the perfect solution.

Figure 2:
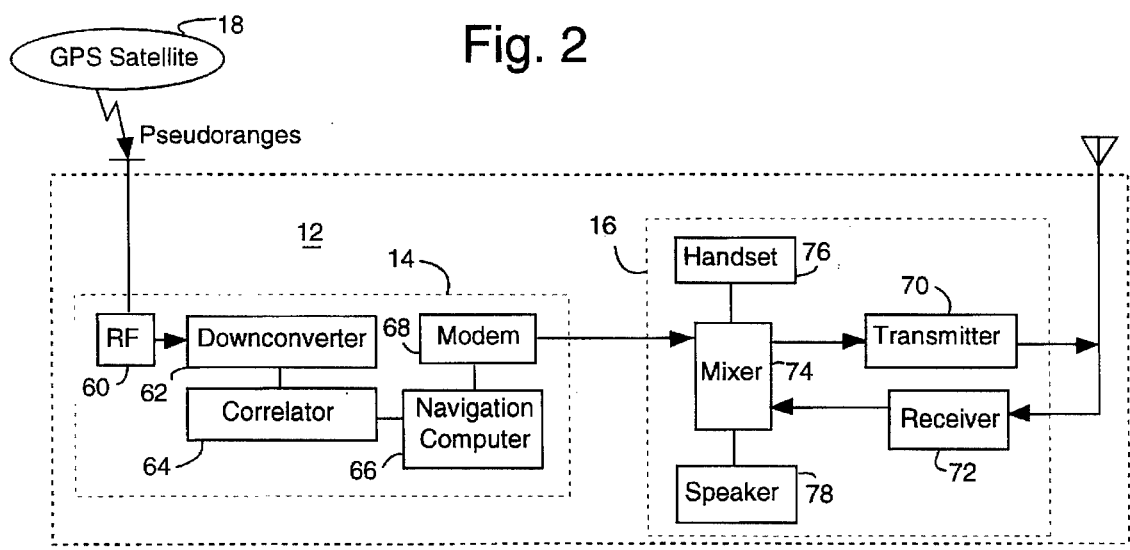
FIG. 2 is a block diagram of the cellular telephone of FIG. 1.

FIG. 2 illustrates cellular telephone 12 in more detail. A radio frequency (RF) amplifier 60 receives the pseudorange information from GPS satellite 18 and a downconverter 62 provides a signal to a correlator 64. A navigation computer 66 uses demodulated information from the correlator 64 to compute a position fix and to develop velocity information. Such information is sent to a modem 68 and may be expressed in latitude, longitude format, earth-centered, earth-fixed (ECEF) format, etc. Preferably for system interface consistency with the database processing facility 22, the information is sent out in velocity, latitude, longitude and compass bearing format. Within the transceiver 16, a transmitter 70 and a receiver 72 provide standard cellular telephone service communication. A mixer 74 inputs the position and bearing information as digital modem tones and coordinates the users use of a handset 76 and a speaker 78.

Since all stations in a geographic area will be more-or-less equally affected by SA, stations with known fixed locations can assess the dither offsets by comparing GPS computed positions with the known position. Such differential correction signals can then be broadcast in real-time on a low frequency beacon channel to be used by GPS receivers in the area to correct their computed positions by an appropriate direction and magnitude. Differential GPS can provide two to five meter accuracy for even unauthorized GPS receivers. Such a beacon station is in operation at Montauk, N.Y.

Non-emergency position information can also be provided by system 10. For example, a special access telephone number is input to cellular telephone 12. Cellular station 20 then routes the call to the database processing facility 22. Latitude, longitude and bearing information from GPS receiver 14 are then used to index a street address database. The street name, block address, city, zip code and jurisdictional information are related to latitude and longitude information for every significant street in an operational region. Streets are also arranged in a hierarchy, such as freeways, highways, side streets and alleyways. Street intersections are also database related to their respective latitudes and longitudes. Street bearings, e.g., north-south, are also stored to provide a bearing constraint to improve navigation solution accuracies. If cellular telephone 12 is mounted in a car or other vehicle, the position solution is constrained to the position of streets. The access-telephone-number call then is responded to with a spoken phrase output by a speech synthesizer, e.g., a street address or cross-street location.

Another service provided by system 10 is polling the whereabouts of the cellular telephone 12, e.g., a telephone number associated with cellular telephone 12 and an access code to release such information. In such scenarios, the database processing facility 22 accesses the cellular telephone 12 through the nearest cellular station 20, and causes the cellular transceiver 16 to answer but not ring the handset. Such a function is conventionally provided by FAX modems which do a silent answer to see if a FAX machine is calling in. GPS receiver 14 then provides latitude, longitude and bearing information which is converted by database processing facility 22 into terms useful to lay persons, e.g., "North-bound on Highway 101 near the Mathilda interchange in Sunnyvale, Calif.". Such responses are preferably spoken automatically with a speech synthesizer to obviate the need for special equipment by the caller. However, an automated polling system with a digital information input for position and bearing data are useful in a real-time fleet dispatch system, such as police and fire response dispatching where each mobile unit is equipped with a cellular telephone 12.

Figure 3:
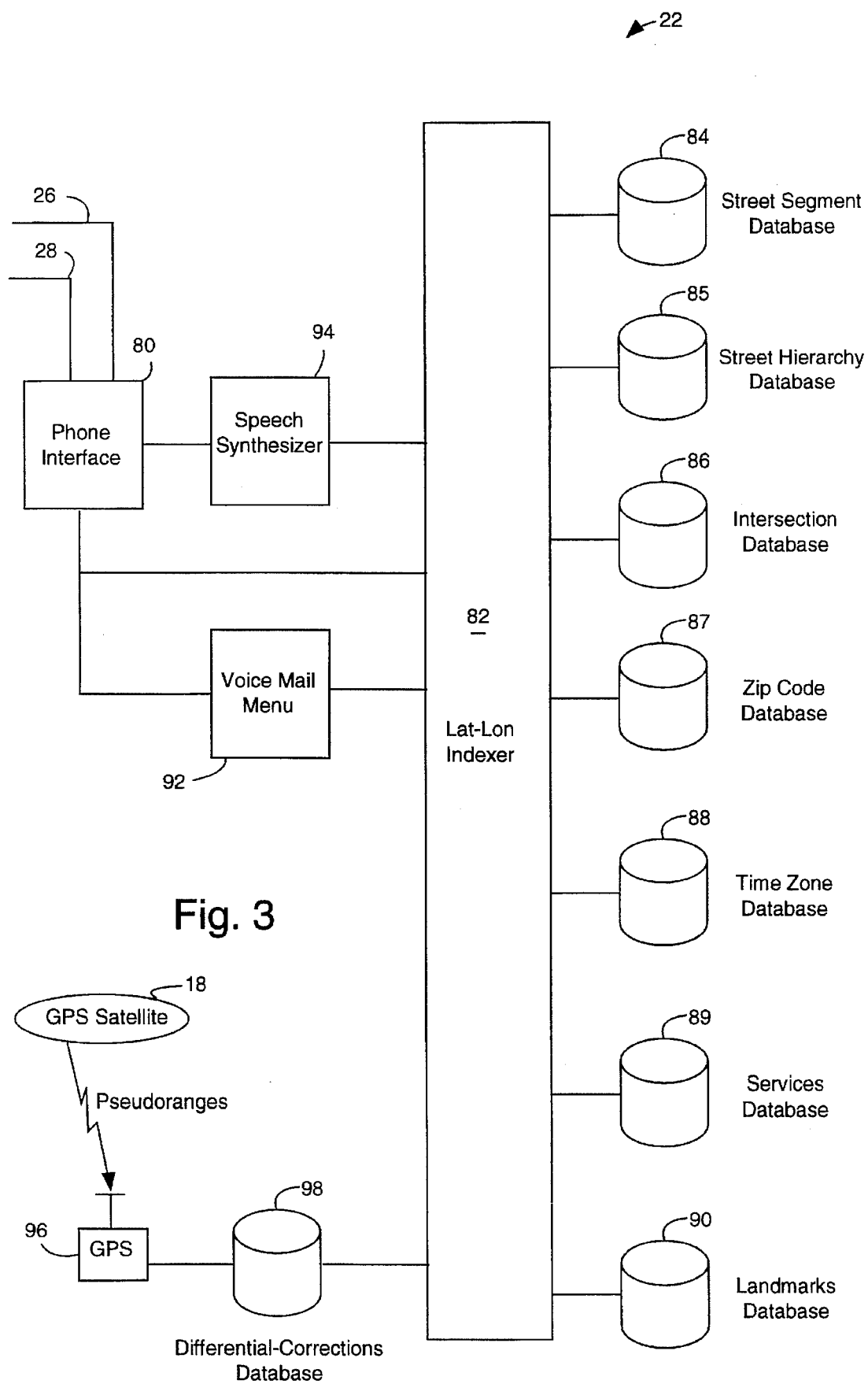
FIG. 3 is a block diagram of the data processing facility of FIG. 1.

FIG. 3 illustrates an implementation of the database processing facility 22 (FIG. 1) and is similar to that which is used for facility 152 (as described later in connection with FIG. 4). A telephone interface 80 couples landlines 26 and 28 to a latitude-longitude (Lat-Lon) indexer 82. A plurality of discrete databases, represented by databases 84–90, are selectively accessed by indexer 82 in response to signals received by telephone interface 80 and a voice mail menu unit 92. If commanded by a user request recognized by unit 92, a speech synthesizer 94 is used to speak a meaningful descriptor accessed by indexer 82 from one or more of the databases 84–90. Indexer 82 may be implemented with a personal computer system having a disk operating system (DOS) and one or more hard disk drives for storage of the databases 84–90. Commercial hardware and software, including relational database software and street map information in digital form, is readily available and conventional.

Spoken directions from speech synthesizer 94 are used to elicit user responses for the voice mail menu unit 92. Depending on what a particular user is requesting, one or more databases 84–90 will be accessed by indexer 82.

A GPS receiver 96 receives signals from a plurality of GPS satellites 18 and has a fixed, known location. A computed position is compared to the known location for each satellite 18 with a time tag and stored as post process differential correction data in a database 98. Such data is accessible by indexer 82 to differentially-correct latitude and longitude information supplied by GPS receiver 14.

Alternatively, GPS receiver 96 may be remotely located from facility 22 and communicate its differential correction data over a landline, such as landlines 26 and 28, through telephone interface 80.

Database 84 is a street segment database wherein the latitudes and longitudes of various continuous streets within a region are related to street names, block addresses and bearings. Latitude, longitude and bearing information provided in real-time for cellular telephone 12 are used relationally to obtain the name of the street, the block address and bearings of streets in the area of cellular telephone 12.

Each such candidate is test-fit to find the best fit. If a bearing constraint is sensible in a particular application, such as a car telephone use, then the bearing of the car is used to constrain which street solution is ultimately decided upon. Further constraints can include regional constraints, where street segments far removed from the estimated immediate area of cellular telephone 12 are removed from the relational access and search.

Database 85 is a street hierarchy database wherein the latitudes and longitudes of various continuous streets within a region are related to classes of streets, e.g., by size, such as freeway, highway, side street or alleyway. Latitude, longitude and bearing information provided in real-time for cellular telephone 12 are used relationally to obtain the name of a street at an appropriate classification level. For example, a local resident may find it more useful to have the expression of the location of cellular telephone 12 stated in terms of side street addresses. However, a visitor or non-resident would only find it useful to have a location expressed in terms of nearby freeways and intersections of major roadways.

Database 86 is a street intersection database that includes relational data for each intersection of a street with another street in a regional geographic area and the earth navigation locations of such intersection and their corresponding common street names.

Database 87 is a zip code database that includes relational data for each mailing code in a regional geographic area and the earth navigation locations of such areas and their corresponding numbers.

Database 88 is a time zone database that includes relational data for each time zone in a regional geographic area, and alternatively including the whole earth, and the earth navigation locations of such time zones together with their corresponding offsets from Universal Standard Time. The time zone database 88 is used to convert incoming latitude and longitude information into earth time zone data. Such converted data is transmitted back to the cellular telephone 12 and used by the update device 32 (FIG. 1) to periodically correct the local time display of the clock 30.

Database 89 is a road services database that includes relational data for each roadside service in a regional geographic area and the earth navigation locations of such businesses and their corresponding common street names and addresses. Examples of such roadside businesses are banks, gas stations, car rental agency return centers, airports, etc.

Database 90 is a landmarks database that includes relational data for each landmark in a regional geographic area and the earth navigation locations of such landmarks and their corresponding common street addresses or common location descriptions. Examples of such landmarks are the Golden Gate Bridge, Santa Clara University, Candlestick Park, Mount Hamilton, etc.

Indexer 82 is preferably configured to be able to express through speech synthesizer 94 the route necessary for cellular telephone 12 to take to get from its current position to another location, e.g., one of the intersections, landmarks or road side businesses or other points stored in databases 84–90.

A time zone database 100 (FIG. 3) is alternatively included in the database processing facility 22 to convert incoming latitude and longitude information into earth time zone data. Such converted data is transmitted back to the cellular telephone 12 and used by the update device 32 (FIG. 1) to periodically correct the local time display of the clock 30.

Many other specialized databases can be included in the database processing facility 22 for use in particular applications. For example, a database of facilities local to the GPS receiver can be included. Also, political jurisdictional and business area information can be converted from latitude and longitude reports for use in police, fire, ambulance, taxi and package delivery dispatch. Tax Assessor parcel numbers and landowner identification records can be automatically accessed simply and efficiently by positioning the cellular telephone 12 at an appropriate location. With sub-meter accurate type GPS receivers 14, individual trees for harvest are identifiable or locatable, as are telephone utility poles and water meters and valve boxes. A database for telephone area code information would allow a user to skip the entry of the area code in cellular telephone 12 when making local calls.

Figure 4:
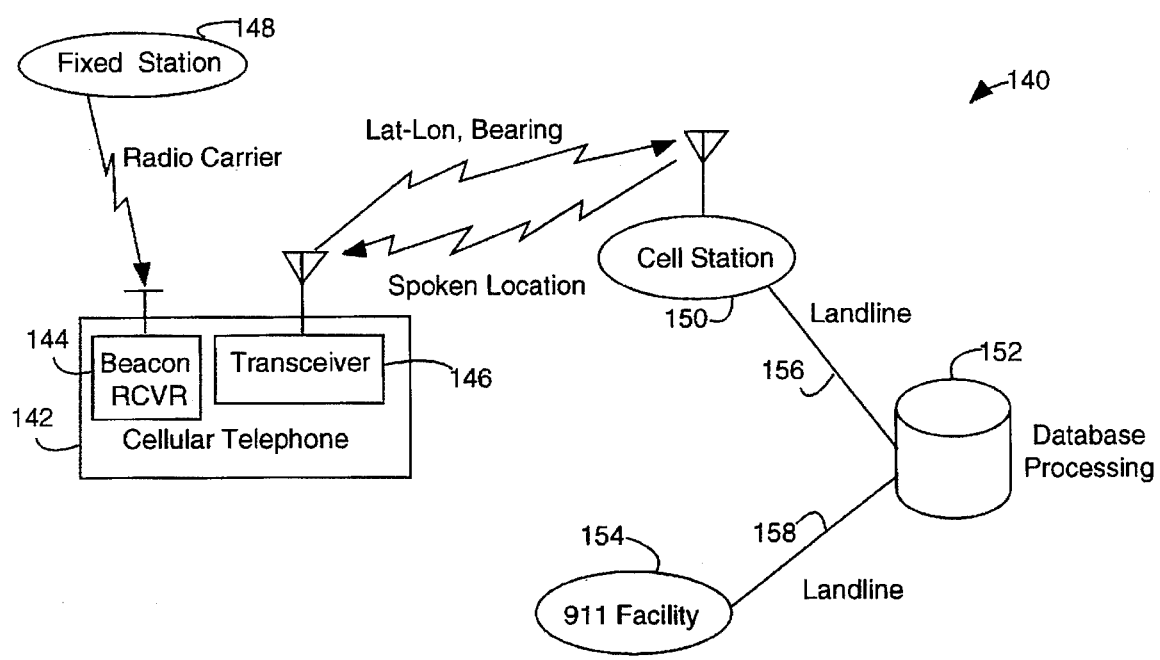
FIG. 4 is a block diagram of a fixed radio beacon based cellular telephone position reporting system embodiment of the present invention.

FIG. 4 illustrates a system 140, similar to system 10, which includes a cellular telephone 142 with a fixed radio beacon based navigation receiver 144 and a cellular transceiver 146. A fixed radio beacon station 148 provides a radio carrier that is used in a triangulation of carrier phases from other such stations to determine the position and heading of the cellular telephone 146. The other elements of system 140 are similar to those of system 10. A cellular station 150 communicates with cellular transceiver 146 and provides position and bearing data to a database processing facility 152. A "911" facility 154 receives street address information or other useful descriptions in layman formats. An ordinary landline 156 interconnects cellular station 150 with database processing facility 152, as does a landline 158 connect to the "911" facility 154.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An improved cellular locating system (10) comprising a remote unit (12) for receiving transmissions from orbiting overhead navigation satellites (18), a cell station (20) for receiving satellite range information from the remote unit (12) over a cellular-radio-telephone-network signal, and a clock (30) for displaying local time, the improvement comprising:

a database processing facility (22) connected (26, 80) to receive a plurality of latitude, longitude and bearing information from the cell station (20);

an indexer (82) connected to index into a plurality of databases (84–90) according to said plurality of latitude, longitude and bearing information;

a speech synthesizer (94) provides to an output a spoken voice phrase information about the location of the remote unit (12);

a street segment database (84) wherein the latitudes and longitudes of various continuous streets within a region are related to street names, block addresses and bearings and latitude, longitude and bearing information is provided in real-time for remote unit (12) are used relationally to obtain the name of the street, the block address and bearings of streets in the area of remote unit (12) and each such candidate is test-fit to find a best fit, and wherein if a bearing constraint is sensible in a particular application the bearing is used to constrain which street solution is ultimately decided upon, and wherein further constraints include regional constraints, where street segments far removed from an estimated immediate area of remote unit (12) are removed from the relational access and search;

a street hierarchy database (85) wherein the latitudes and longitudes of various continuous streets within a region are related to classes of streets, and latitude, longitude and bearing information is provided in real-time for the remote unit (12) and used relationally to obtain the name of a street at an appropriate classification level;

a street intersection database (86) that includes relational data for each intersection of a street with another street in a regional geographic area and the earth navigation locations of such intersections and their corresponding common street names;

a zip code database (87) that includes relational data for each mailing code in a regional geographic area and the earth navigation locations of such areas and their corresponding numbers;

a time zone database (88) that includes relational data for each time zone in a regional geographic area, and alternatively including the whole earth, and the earth navigation locations of such time zones together with their corresponding offsets from Universal Standard Time, wherein the time zone database (88) is used to convert incoming latitude and longitude information into earth time zone data and such converted data is transmitted back to the remote unit (12) and used by an update device (32) to periodically correct a local time display of said clock (30);

a road services database (89) that includes relational data for each roadside service in a regional geographic area and the earth navigation locations of such businesses and their corresponding common street names and addresses; and a landmarks database (90) that includes relational data for each landmark in a regional geographic area and the earth navigation locations of such landmarks and their corresponding common street addresses or common location descriptions;

wherein, the indexer (82) is configured to express through the speech synthesizer (94) a route necessary to take to get from a current position to another location verbally described in terms of one of the intersections, landmarks or road side businesses or other points stored in said databases (84-90).

\* \* \* \* \*